Sept. 3, 1963   W. ENGELMANN   3,102,745
SECURING DEVICE
Filed May 23, 1960
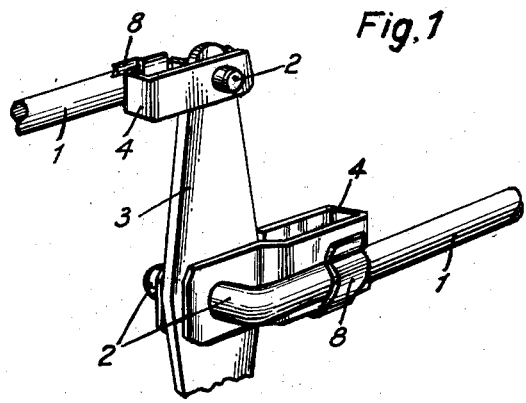
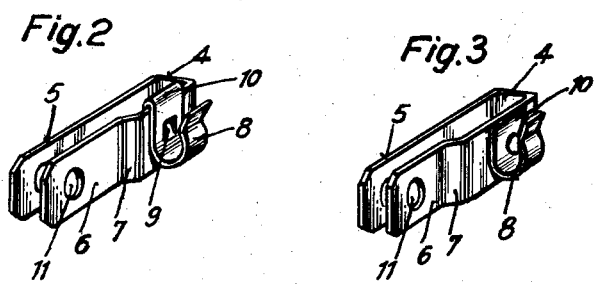
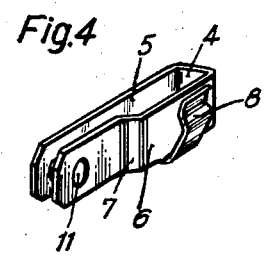
INVENTOR
WALTER ENGELMANN
BY *Dicke, Craig & Freudenberg*
ATTORNEYS

United States Patent Office 3,102,745
Patented Sept. 3, 1963

3,102,745
SECURING DEVICE
Walter Engelmann, Eislingen (Fils), Germany, assignor to Druckknopf- und Metallwarenfabrik A. Raymond, Loerrach, Baden, Germany
Filed May 23, 1960, Ser. No. 31,117
Claims priority, application Germany May 27, 1959
5 Claims. (Cl. 287—93)

The present invention relates to a device for securing angularly bent bars, rods, or the like in bores of other elements.

When rods, bars, levers, or the like are to be connected to each other, it occurs very frequently that an angularly bent end of a bar, rod, or the like is to be inserted into a bore in an adjacent element and to be secured in a fixed position relative to such an element. The known securing means for this purpose usually consist of cotter pins, nuts, screws, by upsetting the end of the rod to form a head thereon, or by similar means. In every case it is therefore necessary to machine the angular end in some manner which necessarily means a considerable expense.

It is an object of the present invention to provide a very simple and inexpensive device for securing angularly bent rods or the like in bores of adjacent elements.

Another object of the invention is to provide such a securing device which does not require any machining or tooling of the angular end of the rod, is easily applied and removed, and affords a very secure connection of the rod to the adjacent element.

These objects are attained according to the invention by the provision of a substantially U-shaped clamp or bracket, the two arms of which, between which the adjacent element is to be inserted, are provided with bores coinciding with a bore in the element. The angular end of the rod is then to be passed through these coinciding bores. For securing the rod in the inserted position, one arm of the bracket carries a substantially U-shaped spring clip into which a part of the rod adjacent to the bent end is to be inserted so as to be gripped thereby.

Although the securing device according to the invention is primarily intended for securing a rod of a cylindrical cross section which has an angularly bent end portion, the device may also be applied to a rod of any other cross section. The element to which the rod is to be connected may also be of any desired shape and it may be, for example, a lever, arm, wall portion, link, or the like. Insofar as the invention is concerned, it is merely essential that an angular end of one element is to be secured in a bore in another element without requiring the bent end to be machined or tooled in any manner. The securing device according to the invention also does not prevent the two connected elements from being easily pivotable relative to each other. If, however, the two elements are to be rigidly connected to each other, the angular end on the one element and the bore in the other element only have to be made of a corresponding non-circular shape.

These objects, features, and advantages of the present invention will become further apparent from the following detailed description thereof, particularly when read with reference to the accompanying drawings, in which—

FIGURE 1 shows a perspective view of a pair of connecting rods with angular ends connected to a lever-like element and secured in position thereon by the device according to the invention;

FIGURE 2 shows a perspective view of the securing bracket with the spring clip hooked thereon;

FIGURE 3 shows a similar view of the securing bracket with the spring clip riveted thereto; while FIGURE 4 shows a similar view of a modification of the invention.

FIGURE 1 illustrates the manner in which two rods 1 of a round cross section are pivotably connected to a lever 3 or similar element by being provided with rectangularly bent ends 2 which are inserted into suitable bores in arm 3. For securing these end portions 2 to arm 3, each rod 1 is provided with a U-shaped securing clamp or bracket 4 which carries a resilient clip 8 on one side thereof which is adapted to grip rod 1. The end portion 2 of each rod 1 may also be bent at any other than a right angle, in which case the securing bracket 4 may be shaped accordingly to permit an easy insertion and securing of the rod.

As illustrated in FIGURE 2, the U-shaped securing bracket 4 has a pair of parallel arms 5 and 5 which are provided at their outer ends with bores 11 through which the bent end 2 of a rod 1 may be inserted. The ends of arms 5 and 6 then embrace the intermediate element 3. In order to prevent the bent end portion 2 from being inserted too deeply into bores 11 in which case the rounded corner between rod 1 and the bent end 2 might cause a wedging action which would prevent the free pivotability of arm 3 on the end portion 2, arm 6 is bent outwardly at 7 so that the rear part of this arm will be spaced at a greater distance from the other arm than the front part.

The rear part of arm 6 further carries on its outside a safety clip 8 which is likewise preferably made of a substantially U-shaped form and the free outer end of which is adapted to surround and grip rod 1 resiliently. The inner end 10 of clip 8 engages with arm 6 and may be secured thereto in any suitable manner.

Thus, for example, as illustrated in FIGURE 2, the inner end 10 of clip 8 may be bent over and hooked on arm 6, and for securing the clip to arm 6, it may, for example, be provided with a punched-out tab 9 which is adapted to snap into a recess or bore in arm 6 so as to prevent clip 8 from being removed.

The inner end 10 of safety clip 8 may, however, also be riveted or spot-welded to the inner or outer side of arm 6, as indicated in FIGURE 3. The securing bracket 4 according to FIGURES 2 and 3 may consist of ordinary strip steel, and only the safety clip 8 needs to be made of spring steel. Instead of making the securing bracket 4 and the spring clip 8 of two separate parts which have to be secured to each other it is, however, also possible to make them of a single piece of spring steel, as illustrated in FIGURE 4.

For applying the securing bracket 4, it is merely necessary to slide the two arms 5 and 6 thereof over the element 3 so that bores 11 coincide with the bore in this element, then to insert the bent end portion 2 of rod 1 through these bores, and finally to press rod 1 downwardly to snap into the safety clip 8. In this position, bracket 4 and rod 1 will extend parallel to each other. The end portion 2 can then no longer slide out of the bore in the element 3 and is thus securely attached thereto, although the two parts 1 and 3 will not be prevented by the securing bracket from pivoting freely relative to each other. For disconnecting rod 1 from element 3, it is merely necessary to pull rod 1 out of clip 8 by bending the clip outwardly, whereupon the end portion 2 of rod 1 may be easily pulled out of bores 11 and the bore in element 3.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A linkage clip for application to a pivotal joint between two parts consisting of a rod member having an angularly bent end forming a pivot pin and a straight portion adjoining said end and an adjacent member having a bore therein to retain said pivot pin in said bore and prevent lateral sliding and angular movements between said two members in planes containing the pivot pin axis, comprising a substantially U-shaped bracket assembly having a pair of spaced arms connected to each other at one end, each said arm having a bore in the other end, said arms being adapted to be fitted over said adjacent member so as to embrace the same at both sides thereof and in a position in which the bores in said arms coincide with said bore in said adjacent member, said bracket assembly also including a spring clip arranged in a fixed position adjacent said one end of said arms and disposed at the outside of one of said arms, said spring clip including a leg portion arranged approximately in a plane extending essentially parallel to said one arm of said assembly and spaced outwardly therefrom, and means securing said leg portion to said one arm of said assembly, the open end of said spring clip facing in a direction essentially at right angles to said pivot pin axis and the straight portion of said rod, whereby after said pivot pin is inserted through said bores in said pair of arms and said adjacent member, the part of the straight portion of the rod member adjacent to said pivot pin is inserted into said spring clip to be gripped thereby and retained in a position substantially parallel to the arms of said bracket assembly to thereby secure the two parts together.

2. A device as defined in claim 1, which said one arm of said bracket has an outwardly offset portion spaced from the bore therein to compensate for the curved edge between the straight portion of said rod member and said bent end thereof.

3. A device as defined in claim 1, wherein said means for securing said leg portion to said one arm comprises a second leg portion parallel to said first-mentioned leg portion, said second leg portion being bent over so as to form a hook adapted to be slipped over said one arm of said assembly, said one arm and said second leg portion having interengaging portions so as to lock said spring clip to said one arm in the hooked position thereof, said first-mentined leg portion of said clip being adapted to surround and resiliently grip said rod member.

4. A device as defined in claim 1, wherein said means for securing said leg portion to said one arm comprises a second leg portion parallel to said first-mentioned leg portion, said second leg portion being rigidly secured to a rear portion of said one arm of said assembly at a distance spaced from said bores.

5. A device as defined in claim 1, wherein said one arm of said assembly and said leg portion of said spring clip are integrally secured to each other and consist of a single piece of material.

References Cited in the file of this patent
UNITED STATES PATENTS

| | | |
|---|---|---|
| 1,880,319 | Iasillo | Oct. 4, 1932 |
| 1,992,708 | Mammen | Feb. 26, 1935 |
| 2,578,639 | Bedford | Dec. 11, 1951 |
| 2,961,261 | Fernberg et al. | Nov. 22, 1960 |